April 11, 1939. N. DIFAZIO 2,153,825

STUFFING BOX WITHOUT PACKING

Filed Sept. 17, 1937

INVENTOR
NICHOLAS DIFAZIO
BY
*Richards & Geier*
ATTORNEYS

Patented Apr. 11, 1939

2,153,825

UNITED STATES PATENT OFFICE 2,153,825

STUFFING BOX WITHOUT PACKING

Nicholas Difazio, Newark, N. J.

Application September 17, 1937, Serial No. 164,288

3 Claims. (Cl. 285—10)

My invention is particularly applicable for use with hollow rollers, the interior of which are constructed to receive a cooling or heating medium. For purposes of description, I will resort to the type of roller in which a cooling medium is used. In this type of roller, water is continually circulated through the interior of the rollers. This water is under pressure, and it has been customary to prevent leakage of the water at the end of the roller shaft, by means of a stuffing box. It is common practise to provide a packing in the stuffing box, which when necessary, can be tightened so as to prevent leakage. However, the life of the packing is short and in many instances the packing cuts the shaft of the roller, thus requiring a complete replacement. Also in view of the limited life of the packing, it is necessary to pack the shaft at frequent intervals of time. This in itself entails a considerable expense, as it requires both time and a shut down of the machine.

It is an object of my invention to provide a complete seal for the roller shaft against the leakage of water without the use of packing. This I accomplish by my construction. In the event that there is a leakage, I have made provision for tightening my device to take up such wear as will cause the slight amount of leakage. By the use of my device there is very little occasion for replacement of parts, and after an installation is once made, it is an inexpensive matter to maintain the same.

Other objects of my invention will become apparent as the description proceeds. For purposes of illustration, I have shown a preferred embodiment of my invention, in which.

Figure 1:
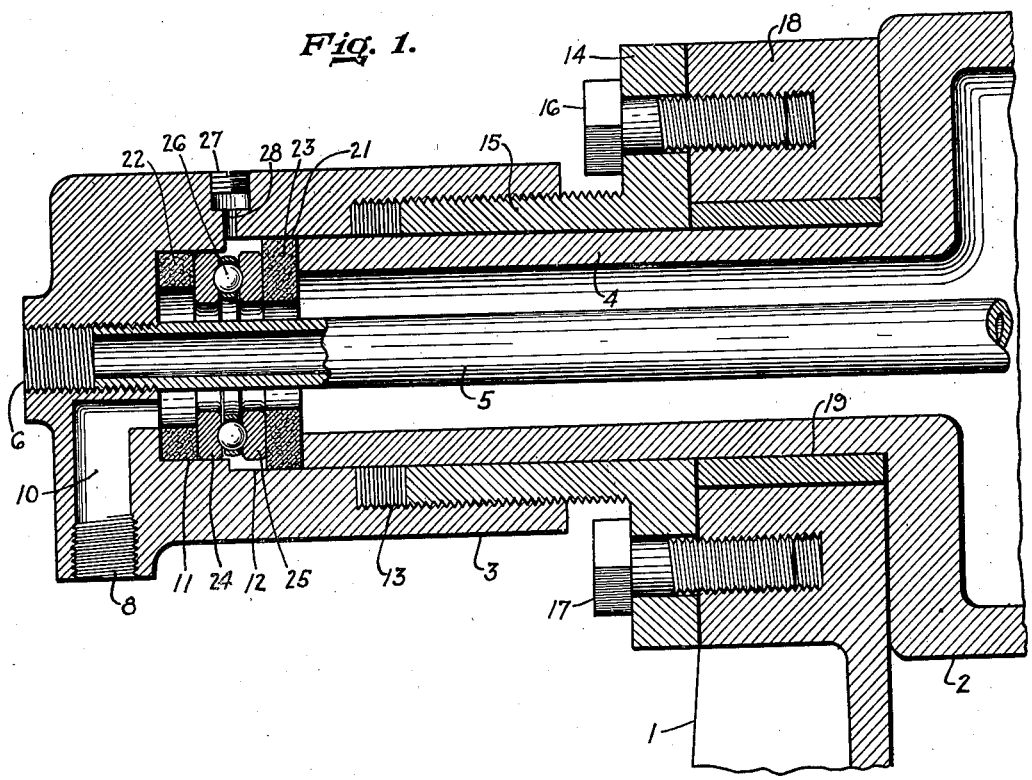
Fig. 1 is a sectional elevational view through the end of a hollow roller, showing my sealing means associated therewith.
Figure 2:
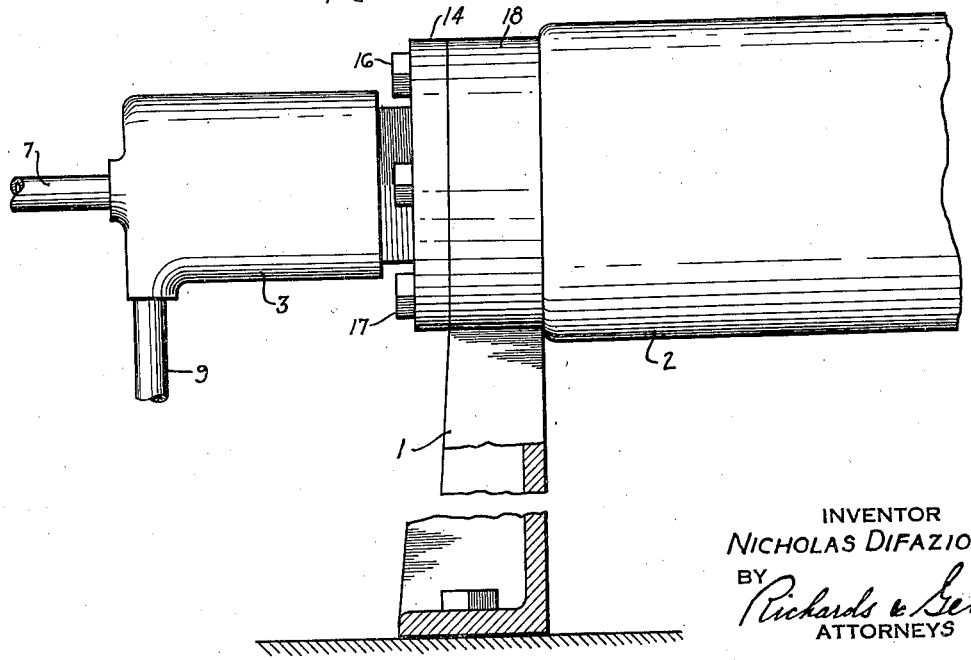
Fig. 2 is an elevational view of my invention shown in application with the end of a hollow roller.

In the drawing, the hollow roller 2 is rotatably supported by the bearing 19 in the stationary pedestal 1. The hollow roller 2 has an extension shaft 4, of less diameter than the diameter of roller 2. Provision must be made for cooling the interior of the roller 2. This is accomplished by circulating a cooling medium, such as water under pressure, within the interior of the roller. The cooling water enters through an inlet pipe 7 attached by a screw thread connection 6 to the cylindrical housing 3. In line with the pipe 7 is a second pipe 5, similarly attached and axially located relative to the housing 3. Cold water enters through the pipe 5, circulates within the interior of the roller 2, cooling the same. The water flows from the interior of the roller 2 around the outer surface of the pipe 5, flows to an outlet passage 10, in the end of the cylindrical housing 3. The passage 10 has a pipe thread connection 8 to receive one end of the outlet pipe 9. In normal operation there is a continual flow of cooling liquid into the pipe 7, and after it has performed its cooling function, it flows out of the pipe 9. This water is under pressure, and it has become a problem to prevent leakage of the same from the end of the roller shaft.

I have succeeded in making a water tight seal, by the use of my cylindrical housing 3, in cooperation with the flange 14. As illustrated, the flange 14 is fixedly attached to the portion 18 of the standard 1, by means of a series of threaded bolts such as 16 and 17. The flange 14 has an extension 15 which is bored to receive the shaft 4. The flange extension 15 has an external thread which cooperates with the internal thread 13 of the housing 3.

The interior of the housing 3 is bored to different diameters, as indicated by the numerals 11 and 12. The narrow bore 11 receives a hard fibre washer 22. Adjacent the washer 22, an end thrust ball-bearing is positioned. This ball-bearing comprises the races 24 and 25, and an intermediate ring of balls 26. Adjacent the outer race 25 there is positioned a second hard fibre washer 23 of larger diameter than the first mentioned washer 22. As will be noticed from the drawing, the washer 23 is positioned in the larger bore 12 of the housing 3.

Located directly above the ball-bearing ring 26, is a conventional grease chamber 27, which through the passage 28, provides what necessary lubrication is required for the ball-bearing ring 25.

The fibre washer 23 has a very close fit with the interior wall of the bore 12. The closeness of this fit is such as not to permit the passage of the cooling medium between the wall of the bore 12 and the circumferential surface 21 of the washer 23. In an assembled position, the end of the roller shaft 4 is in direct abutting engagement with one side of the fibre washer 23, as illustrated in Fig. 1. Under ordinary circumstances, water circulating around the pipe 5 will pass through passages of the fibre washers 22, 23, and the end thrust ball-bearing 24 to 25, so as to reach the passage 10. If there is a complete seal between the surface of the bore 12 and the circumferential surface 21 of the hard fibre washer 23, and between the end of the roller shaft 4 with the cooperating side wall of the washer 23, there can be no leakage of the cooling medium out of the housing 3, between the shaft 4 and the housing 3. In normal operation, the roller 2 rotates and as a consequence, the shaft 4 rotates with the hard fibre washer 23 within the bore 12 of the housing 3. The housing 3 is held stationary by its association with the fixed flange 14.

After a period of time, there may be a slight wear at the circumferential surface 21 of the hard fibre washer 23, due to its rotation within the bore 12 of the housing 3. This might cause a slight leakage of the cooling medium between these coacting surfaces. In order to eliminate such leakage, it becomes merely necessary to rotate the housing 3 on its threaded flange connection 15. This will cause a take-up of the housing 3 on its threaded support 15, and as a consequence the end of the shaft 4 will be tightly jammed up against the side wall of the hard fibre washer 23. This side pressure of the end of the shaft 4 against the side wall of the pipe washer 23 will cause a sufficient expansion of the diameter of the washer 23, to again get a tight working fit between the washer 23 and the interior of the bore 12. This tightening operation can take place whenever it becomes necessary, in the event that there is a leakage of the cooling medium out of the housing 3 between the cooperating threads of the housing 3 and the flange extension 15. Should the washer 23 become so badly worn that a replacement is necessary, this can be readily accomplished by removing the housing 3 from the threaded flange support 15. It is a simple matter to remove the worn washer 23 and replace the same by a new washer.

I have shown my invention as applied to a single hollow shaft. It is quite apparent, however, that where a series of shafts would be used, my invention could readily be applied individually to the end of each shaft.

By my construction I have eliminated the use of packing, which has heretofore proved detrimental and expensive. My construction is simple, practical and effective in its intended use. It is apparent that anyone skilled in the art might make slight changes, without deviating from the spirit of my invention, as covered by the scope of the following claims:

I claim:

1. The combination with a hollow roller having a hollow rotatable shaft end, inlet means for circulating a cooling medium through the end of said shaft into said roller, and outlet means to receive the flow of the cooling medium from the hollow roller; of means forming a sealed passage between said hollow rotatable shaft and said outlet means, said means comprising a stationary housing bored to receive said shaft end and said inlet means and connected with said outlet means, a stationary washer fitting tightly in one end of the bore of said housing, a rotatable washer engaging the end of said hollow shaft and fitting snugly with the interior walls of the bore of said housing, a thrust-bearing having a stationary race engaging said first-mentioned washer and fitting tightly with the interior wall of the bore of said housing and a rotatable race engaging said second-mentioned washer.

2. The combination with a hollow roller having a hollow rotatable shaft end, inlet means for circulating a cooling medium through the end of said shaft into said roller, and outlet means to receive the flow of the cooling medium from the hollow roller; of means forming a sealed passage between said hollow rotatable shaft and said outlet means, said means comprising a stationary housing bored to receive said shaft end and said inlet means and connected with said outlet means, the external end of said housing having a bore of smaller diameter than said rotatable shaft end communicating with said outlet means, a stationary washer fitting tightly in said smaller bore, a rotatable washer engaging said hollow shaft end and fitting snugly with the interior walls of said larger bore, a thrust-bearing having a stationary race fitting tightly with said smaller bore and engaging said stationary washer, and a rotatable race spaced from the interior walls of said larger bore and engaging said rotatable washer.

3. The combination with a hollow roller having a hollow rotatable shaft end, stationary means for rotatably supporting said shaft, inlet means for circulating a cooling medium through the end of said shaft into said roller, and outlet means to receive the flow of the cooling medium from the hollow roller; of means forming a sealed passage between said hollow rotatable shaft and said outlet means, said means comprising a flanged male member attached to said stationary support, said male member being bored to house the shaft and having its outer surface screw-threaded, a female housing having an internal thread at one end thereof for engagement with the thread of said male member, said female housing having a bore to receive said hollow shaft end and a bore of smaller diameter in the external end thereof, a stationary washer in said smaller bore, a rotatable washer engaging said hollow shaft end and fitting snugly with the interior walls of said larger bore, a thrust-bearing having a stationary race fitting tightly in said smaller bore and engaging said stationary washer and a rotatable race spaced from the interior walls of said larger bore and engaging said rotatable washer.

NICHOLAS DIFAZIO.